(12) United States Patent
Shaffer et al.

(10) Patent No.: US 6,301,246 B1
(45) Date of Patent: Oct. 9, 2001

(54) SILENT MONITORING IN A VOICE-OVER-DATA-NETWORK ENVIRONMENT

(75) Inventors: Shmuel Shaffer, Palo Alto; William Joseph Beyda, Cupertino; Mark Skrzynski, Capitola; Florin M. Gheorghiu, San Jose, all of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/135,715

(22) Filed: Aug. 17, 1998

(51) Int. Cl.[7] .................................................. H04L 12/66
(52) U.S. Cl. .............................. 370/352; 379/34; 710/68
(58) Field of Search ........................... 370/401, 352, 370/412, 353; 348/16; 710/68; 707/3; 709/224, 202; 379/34, 45, 93, 93.17, 5, 265, 96, 266, 219, 220; 434/118

(56) References Cited

U.S. PATENT DOCUMENTS

| | | | |
|---|---|---|---|
| 5,696,811 | 12/1997 | Maloney et al. | 379/34 |
| 5,790,798 | * 8/1998 | Becket, II et al. | 709/224 |
| 5,931,928 | * 8/1999 | Brennan et al. | 710/68 |
| 5,982,767 | * 11/1999 | McIntosh | 370/352 |

* cited by examiner

*Primary Examiner*—Hassan Kizou
*Assistant Examiner*—John Pezzlo

(57) ABSTRACT

A system and method for silent Automatic Call Distributor (ACD) call monitoring in a telephony-over-LAN environment includes an ACD agent terminal for handling incoming calls from customers. A first call between the agent terminal and a customer terminal includes agent voice data and customer voice data. After the agent terminal has set up the first call with the customer terminal, the agent terminal receives a monitoring call setup request from a supervisor terminal. In response to the call setup request, the agent terminal cooperates with the supervisor terminal to establish a monitoring call over which the agent terminal transmits the agent voice data and the customer voice data to the supervisor terminal. The agent terminal monitors the first call for simultaneously transmitted agent voice data and customer voice data. In order to minimize transmission delay in the monitoring call, the agent and customer voice data which was simultaneously transmitted in the first call is reformatted for transmission in the monitoring call. In a preferred embodiment, agent voice data bytes are multiplexed with customer voice data bytes in a consecutively sequential manner and the resulting combination voice data packets are transmitted over the monitoring call. In a second embodiment, the framing of voice data packets in the customer and agent voice data streams is shifted prior to alternately transmitting customer and agent voice data packets over the monitoring call.

20 Claims, 6 Drawing Sheets

SILENT MONITORING IN A VOICE-OVER-DATA-NETWORK ENVIRONMENT

BACKGROUND OF THE INVENTION

The invention relates to a method and system for silently monitoring calls routed through an automatic call distributor (ACD) system and, more specifically, to a method and a system for silently monitoring ACD calls in a voice-over-data-network environment.

ACD systems are employed in a wide range of customer service environments and provide ACD users with an economical and powerful means for providing customer service. Calls can be automatically routed to ACD agents who possess the skills required for a particular call. Management of a customer service department is facilitated by the ability of a manager or supervisor to monitor calls directed to agents and to analyze performance of the agents. The supervisor, utilizing a single terminal, is able to conveniently switch between different ACD agent calls and thereby directly monitor the job performance of a large number of ACD agents.

An example of an ACD for providing customer support for computers and peripheral devices might include a greeting which requires the customer to select from a choice of computer related questions regarding printer malfunctions, an inability to run particular applications on the computer, and software installation on a computer. The option which the customer selects causes the ACD system to transfer the call to a particular agent whose skills match the needs of the customer, as indicated by the selection. Once the call has been answered by an ACD agent, a supervisor can silently monitor the call to evaluate the agent's performance and make recommendations.

With the rapid development of computer network communications capabilities, many of the functions provided by an ACD system can now be performed in a distributed network environment. However, certain obstacles remain to providing effective ACD functionality in a distributed network environment. Specifically, the dominant protocols for voice-over-data-network telephony, for instance the H.323 standard of the International Telecommunication Union, do not provide an effective means for silently monitoring a call.

A voice-over-data-network call, for instance a telephony-over-LAN (TOL) call, includes a first voice data stream transmitted from an agent terminal to a customer terminal and a second voice data stream transmitted from the customer terminal to the agent terminal. One known method for enabling a supervisor terminal to monitor the call includes establishing a monitoring call between the agent terminal and the supervisor terminal. The agent terminal utilizes a digital signal processor (DSP) to mix voice samples from the first voice data stream with voice samples from the second voice data stream into a third voice data stream which is transmitted to the supervisor terminal over the monitoring call. Requiring all agent terminals to have the DSP capabilities to mix the voice samples is often impractical, because of the cost associated with DSP resources required for mixing voice samples. The cost of the ACD system becomes significantly greater if each agent terminal must include the sample-mixing sophistication.

What is required is a method and system for enabling a supervisor terminal to silently monitor agent calls without requiring agent terminals to include substantial otherwise unnecessary resources in establishing the monitoring capability.

SUMMARY OF THE INVENTION

The present invention provides a method and system for enabling monitoring of a first voice-over-data network call between two terminals. A first terminal is configured to transmit first and second voice data of the first network call to a monitoring terminal over a second voice-over-data-network call without integrating voice samples from the first and second voice data. Typically, the first voice data is voice information generated at the first terminal for transmission to a user at a second terminal, while the second voice data is voice information generated at the second terminal for transmission to a user at the first terminal.

The first terminal cooperates with the monitoring terminal to establish the monitoring voice-over-data-network call between the first and monitoring terminals in response to a call-setup request by the monitoring terminal. The first terminal transmits the first and second voice data over the monitoring call without integrating voice samples of the first voice data with voice samples of the second data. Because the first terminal is able to transmit the first and second voice data to the monitoring terminal without having to integrate voice samples, less processing power is required by the first terminal.

In a preferred embodiment the system and method are practiced in a telephony-over-LAN environment, wherein the LAN supports a distributed ACD system. The first terminal is an ACD agent terminal, the second terminal is a customer terminal, and the monitoring terminal is an ACD supervisor terminal. The agent terminal inspects time stamps of data packets in the first call to determine if the time stamps indicate that a first packet of first voice data was transmitted from the agent terminal over the first call at the same time that a second packet of second voice data was transmitted from the customer terminal. If the first packet was transmitted at the same time as the second packet, this indicates that the agent and customer were talking simultaneously. Two different embodiments are employed to transmit first and second voice data over the monitoring call that were simultaneously transmitted in the first call.

In a preferred embodiment, first bytes of first voice data are multiplexed with second bytes of second voice data to form hybrid voice data packets with sequentially alternating first and second bytes. These hybrid voice data packets are transmitted to the monitoring terminal where they are de-multiplexed. Multiplexing first and second voice data prior to transmission to the monitoring terminal is preferred because multiplexing effectively reduces delay which results from real-time transmission in the monitoring call of simultaneously generated first and second voice data.

In an alternative embodiment, prior to transmission over the monitoring call, first voice data is framed into first data packets and second voice data is framed into second data packets such that each first data packet includes first voice data with a transmission time frame which overlaps with the transmission time frame of voice data in consecutive second data packets. Likewise, each second data packet includes voice data with a transmission time frame which overlaps with the transmission time frame of voice data in consecutive first data packets. That is, the framing of the first voice data and second voice data is shifted from the framing alignment in the first call. Consequently, the framing of the first data packets is out of phase with respect to the framing of the second data packets. Preferably, the framing of the first and second voice data is such that the transmission time frame of voice data of each first data packet overlaps with approximately 50% of the voice data in each of two second data packets and, conversely, such that the transmission time frame of voice data in each second data packet overlaps with approximately 50% of the voice data in each of two first data packets.

After the first and second voice data are reframed in the above-described manner, the reframed first and second data packets are alternately transmitted from the agent terminal to the monitoring terminal. In comparison to transmission delay associated with consecutive transmission of first and second data stream packets having 100% overlapping first call transmission time frames, transmission delay is reduced by 50% of the processing time for the preceding packet, because the preceding packet only contains 50% voice data having an overlapping first call transmission time frame.

By refraining from integrating voice samples from the first and second data streams prior to transmitting voice data over the monitoring call, the agent terminal does not require as much processing power. In addition to transmitting first and second voice data from the agent terminal to the monitoring terminal, the monitoring call can support voice information transmitted from the monitoring terminal to the agent terminal. The supervisor is able to communicate suggestions to the agent over the monitoring call while the first call is in progress. Advantageously, the customer terminal does not receive the voice information transmitted from the supervisor terminal.

The agent terminal is also configured to determine processor resource availability and to request a higher bandwidth for the monitoring call compared to the bandwidth utilized in the first call if insufficient processing resources are available to enable the agent terminal to compress first and second data at a higher compression level than in the first call.

In addition to enabling monitoring of voice-over-data-network calls, the system of the present invention can also be utilized to enable monitoring of video streams.

DETAILED DESCRIPTION

Figure 1:
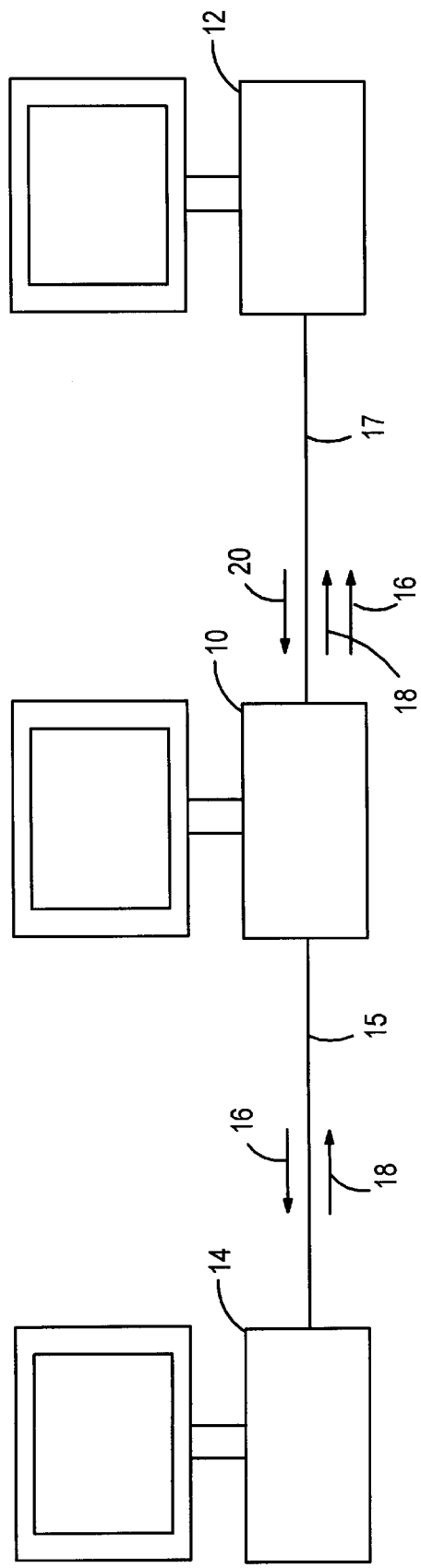
FIG. 1 is a high level schematic diagram illustrating a silent call monitoring system in a telephony-over-LAN environment according to the present invention.

With reference to FIG. 1, a system for silent call monitoring enables a supervisor terminal 12 to monitor a first voice-over-data-network call, for instance a telephony-over-LAN (TOL) call, between an agent terminal 10 and a customer terminal 14. The system is most advantageously employed in a Automatic Call Distribution (ACD) system which directs incoming customer calls to multiple ACD agents (not shown). It is of importance that the agents provide a high level of customer service, and one of the ways of promoting high service levels is to provide the agents with feedback and constructive criticism of the agents' performance. The most effective means for providing feedback to an agent is to enable a supervisor to monitor calls to the agent, so that the supervisor can directly observe the agent in action. Current TOL call signaling and setup protocols, for instance the H.323 protocol, enable multipoint conferencing. However, multipoint conferencing is wasteful of call setup and call signaling resources. The silent call monitoring system to be described below provides an efficient method for monitoring a TOL call between the agent terminal and the customer terminal.

A first TOL call 15 includes a first voice data stream 16 in which digitized voice information is transmitted from the agent terminal 10 to the customer terminal 14 and further includes a second voice data stream 18 which includes digitized voice information transmitted from the customer terminal to the agent terminal. The first and second data streams are two of many data streams transmitted over the first TOL call 15 wherein each data stream contains voice data representing a portion of a conversation between the agent and the customer. The agent terminal 10 and the supervisor terminal 12 cooperate to establish a monitoring call 17 over which the agent terminal transmits the first and second voice data streams 16 and 18 to the supervisor terminal. The first and second voice data streams are transmitted to the supervisor terminal without mixing voice samples from the data streams prior to transmission. That is, the first terminal 10 does not integrate first data stream voice samples with second data stream voice samples to produce a single integrated voice sample from which the first and second data stream voice samples are not readily separable. The fact that the agent terminal does not need to perform mixing of the voice samples significantly reduces the processing requirements of the agent terminal. Furthermore, because the agent terminal is only required to set up a single monitoring call, instead of two separate calls which each include one of the voice data steams, the agent terminal conserves resources during call setup as well as network bandwidth.

Figure 2:
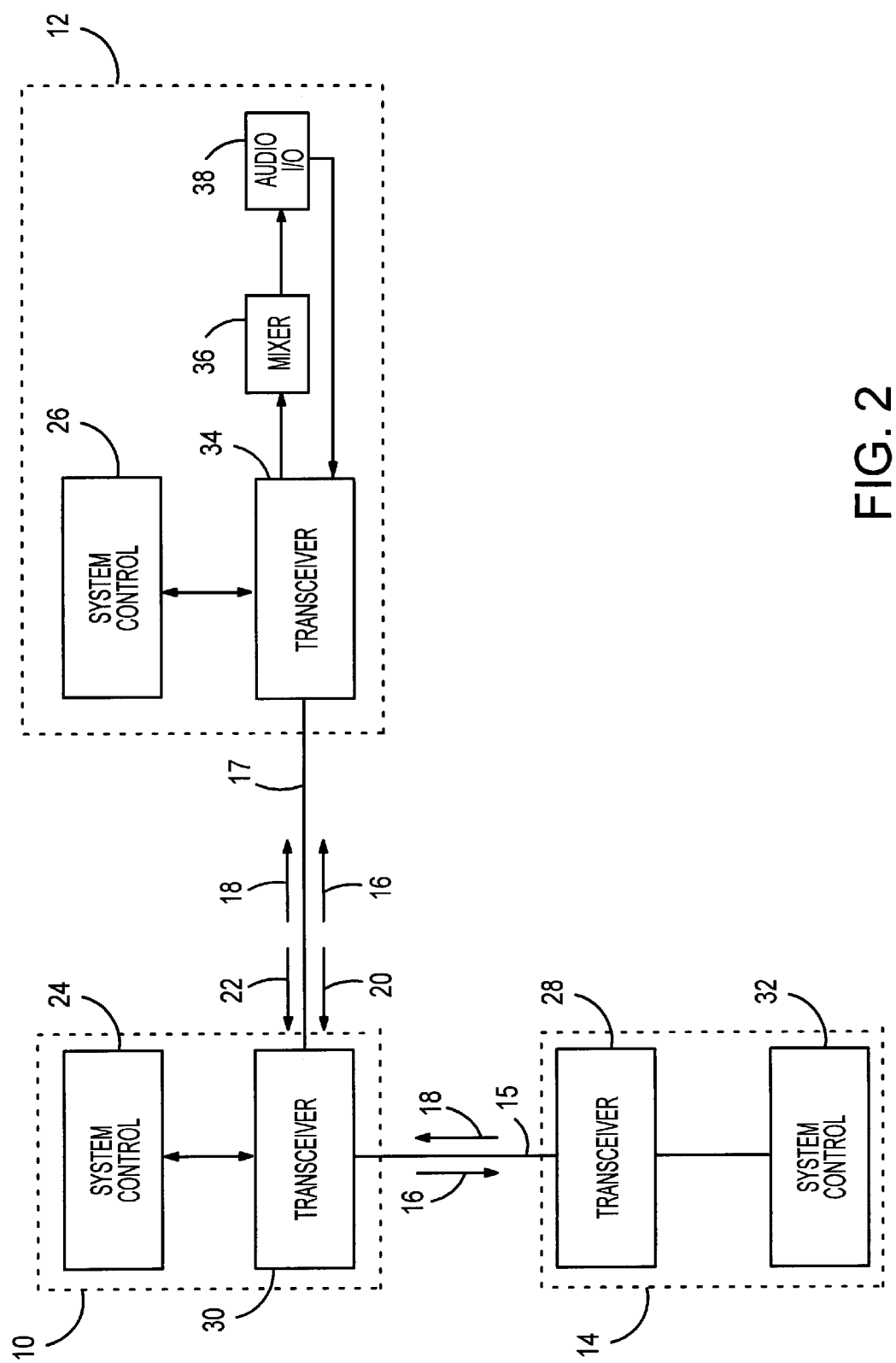
FIG. 2 is a block diagram of the components of an agent terminal and a supervisor terminal of the silent call monitoring system shown in FIG. 1.

Referring to FIG. 2, the customer terminal 14 includes a system control 28 and a transceiver 32 which cooperate with a system control 24 and transceiver 30 at the agent terminal 10 to establish the first call 15. If the customer is located on another network, the call setup will be facilitated by a gateway (not shown). The gateway can also facilitate call setup from a customer terminal on a different type of network, so that the customer terminal might be a digital telephone on an Integrated Services Data Network (ISDN) linked to the agent terminal via the gateway.

Once the first call has been established between the customer and agent terminals 14 and 10, the user of the supervisor terminal 12 might decide to monitor the first call. The supervisor terminal transmits a monitoring call setup request 22 to the agent terminal. The monitoring call setup request specifically identifies to the agent terminal that the request is for a monitoring call, as opposed to a multipoint conference call or a point-to-point call. The agent terminal system control recognizes the monitoring call setup request and requests bandwidth equal to up to twice the bandwidth utilized in the first call if insufficient processor resources are available in the agent terminal. If sufficient processor resources are available, the agent terminal requests less than twice the bandwidth of the first call and enables a higher compression level in the monitoring call than was utilized in the first call. The higher compression is selectively enabled to compress simultaneously transmitted first and second data stream voice data.

In a preferred embodiment, the supervisor terminal 12 includes an audio mixer 36 to enable the supervisor terminal to mix voice samples from the first voice data stream 16 with voice samples from the second voice data stream 18 to form a single voice data stream at the supervisor terminal end of the monitoring call. If the first call includes first and second video streams, the supervisor terminal will also include a video mixer (not shown). Locating the mixing functionality in the supervisor terminal 12, as opposed to the agent terminal 10, is more economical in the context of an ACD system, because the agent terminals substantially outnumber the supervisor terminals. The monitoring call enables transmission of a supervisor voice data stream 20 to the agent terminal 10. Whereas a multipoint conference call would transmit the supervisor voice data stream to the customer terminal 14, the monitoring call, because it is independent of the first call, does not allow the supervisor voice data stream to be transmitted to the customer terminal. Consequently, while the supervisor monitors conversation in the first call, the supervisor is able to pass on comments and suggestions to the ACD agent without the comments reaching the customer.

The agent terminal system control 24 monitors time stamps of first voice data stream packets and second voice data stream packets to identify any packets which were transmitted from the agent terminal 10 simultaneously with transmission of packets from the customer terminal 14. Simultaneously transmitted packets are the result of the agent and the customer speaking at the same time in the first call. Packets which were simultaneously transmitted over the first call should be transmitted in the monitoring call in such a manner as to minimize transmission delay. Two embodiments are employed by the call monitoring system to ensure that delay remains at an acceptable level; a first embodiment multiplexes bytes from the first voice data stream with bytes from the second voice data stream, and the second embodiment employs alternately transmitting first and second voice data stream packets.

Figure 3:
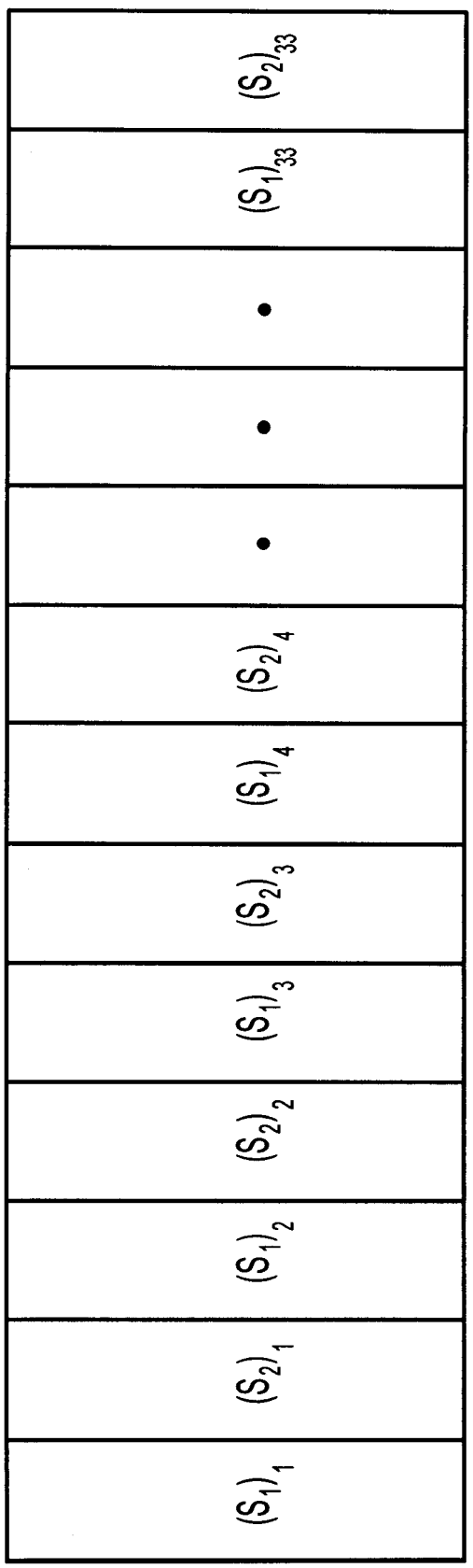
FIG. 3 is a diagram of a multiplexed voice stream data packet according to a first embodiment of the silent call monitoring system shown in FIG. 1.

In the multiplexing embodiment, bytes from the first voice data stream are multiplexed with bytes from the second voice data stream at the agent terminal, such that first and second voice data stream bytes are alternately sequenced in a packet which is transmitted over the monitoring call. Although the multiplexing embodiment combines first data stream bytes with second data stream bytes into a single packet, the voice data from the first and second voice data streams is not integrated to form a single integrated voice data stream. That is, multiplexing is separate and distinct from mixing voice samples. The agent terminal system control 24 and transceiver 30 cooperate to multiplex the first and second voice data stream bytes into multiplexed packets which are transmitted to the supervisor terminal 12, where the packets are de-multiplexed. Referring to FIG. 3, a sixty-six byte multiplexed packet 40 includes sequentially alternating first data stream bytes ($S_1$) and second data stream bytes ($S_2$), beginning at ($S_2$)$_1$ and ($S_2$)$_2$ and continuing up to ($S_1$)$_{33}$ and ($S_2$)$_{33}$.

By alternating first and second data stream bytes into a multiplexed packet, as shown in FIG. 3, delay is significantly reduced in comparison to simply alternating transmission of first and second data stream packets. If first data stream packets are alternately transmitted with second data stream data packets, an ($S_1$) byte of a first data stream packet is not processed by the supervisor terminal until the preceding second data stream packet has been received and processed by the supervisor terminal. Thus, the inherent delay associated with simple alternate packet transmission is approximately a 66 byte time delay. In contrast, the multiplexing embodiment of the call monitoring system only introduces approximately a single byte time delay, because processing of each ($S_1$) byte is only delayed until the preceding ($S_2$) byte is processed by the supervisor terminal.

Figure 4:
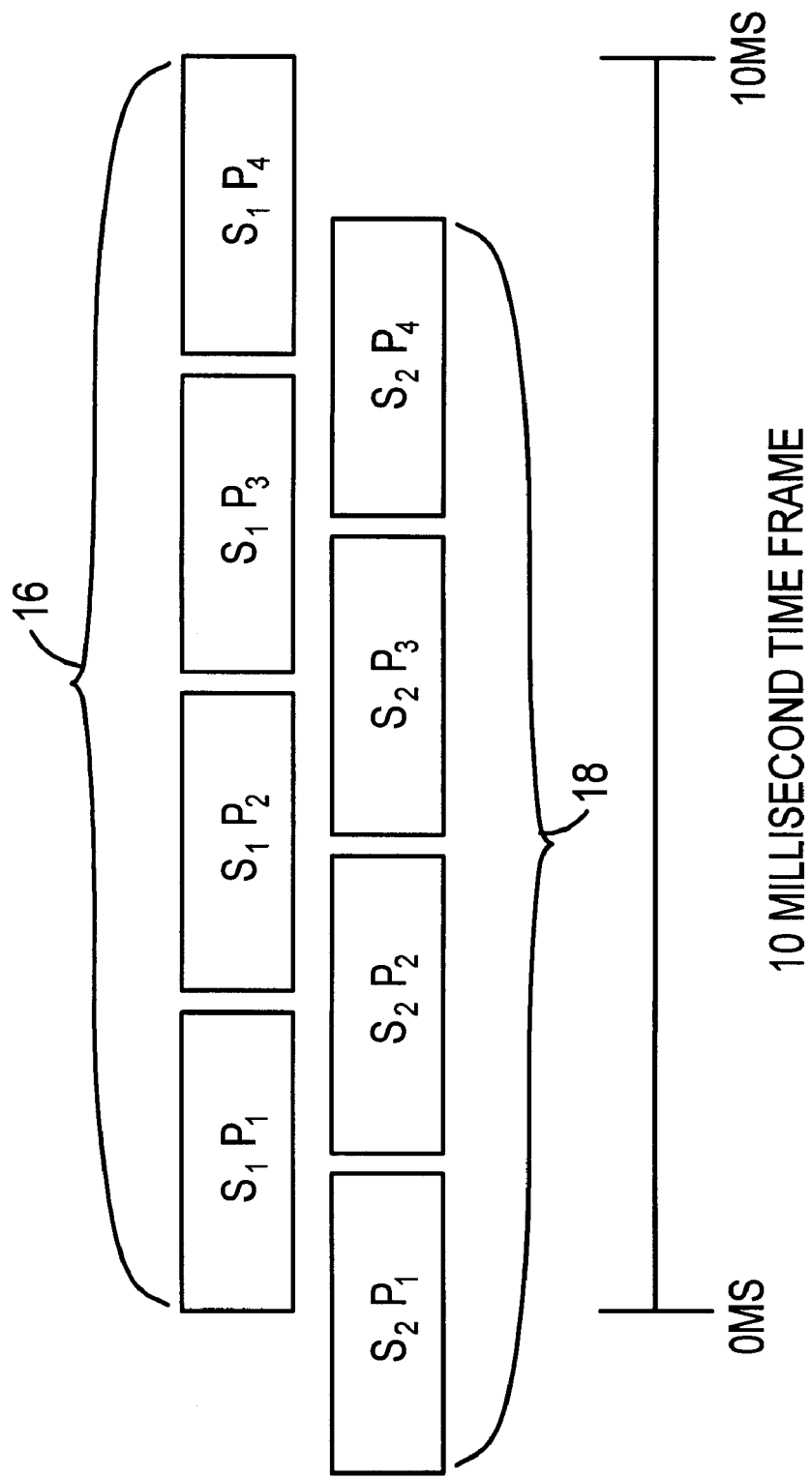
FIG. 4 is a diagram illustrating the framing of first and second data streams according to a second embodiment for the silent call monitoring system in FIG. 1.

With reference to FIG. 4, an alternative embodiment for transmitting the first and second data streams from the agent terminal to the supervisor terminal involves alternating transmission of first data stream packets with second data stream packets and framing the first and second data stream packets in such a manner as to reduce delay. The first voice data stream 16 includes packets $S_1P_1$ through $S_1P_4$ and the second data stream 18 includes packets $S_2P_1$ through $S_2P_4$. The voice data in packets $S_1P_1$ through $S_1P_4$ and $S_2P_1$ through $S_2P_4$ was transmitted simultaneously in the first call from the agent terminal 10 and the customer terminal 14 respectively during a 10 millisecond span. The $S_1P_1$ packet is framed to include voice data which was transmitted from the agent terminal in the first call simultaneously with transmission from the customer terminal of a portion of voice data in the $S_2P_1$ packet and a portion of the voice data in the $S_2P_2$ packet. Preferably, the framing of the first and second data stream is performed by the agent terminal 10 such that the voice data which comprises the first 50% of $S_1P_1$ was transmitted simultaneously with the voice data which comprises the second 50% of $S_2P_1$ and the voice data which comprises the second 50% of $S_1P_1$ was transmitted simultaneously with the voice data which comprises the first 50% of $S_2P_2$.

By framing voice data from the first and second data streams into data packets in the above described manner, delay can be significantly reduced. If a first data stream packet is framed such that there is a 100% overlap with a second data stream packet, and the first data stream packet is transmitted from the agent terminal 10 in the monitoring call subsequent to transmission of the second data stream packet, the first data stream data packet will not be processed by the supervisor terminal until the second data stream packet is completely processed. Consequently, a delay equal to the processing time of a single packet is introduced into the system. In contrast, by framing the packets according to FIG. 4, the delay is effectively reduced in half, because only half of the preceding packet was simultaneously transmitted.

Figure 5:
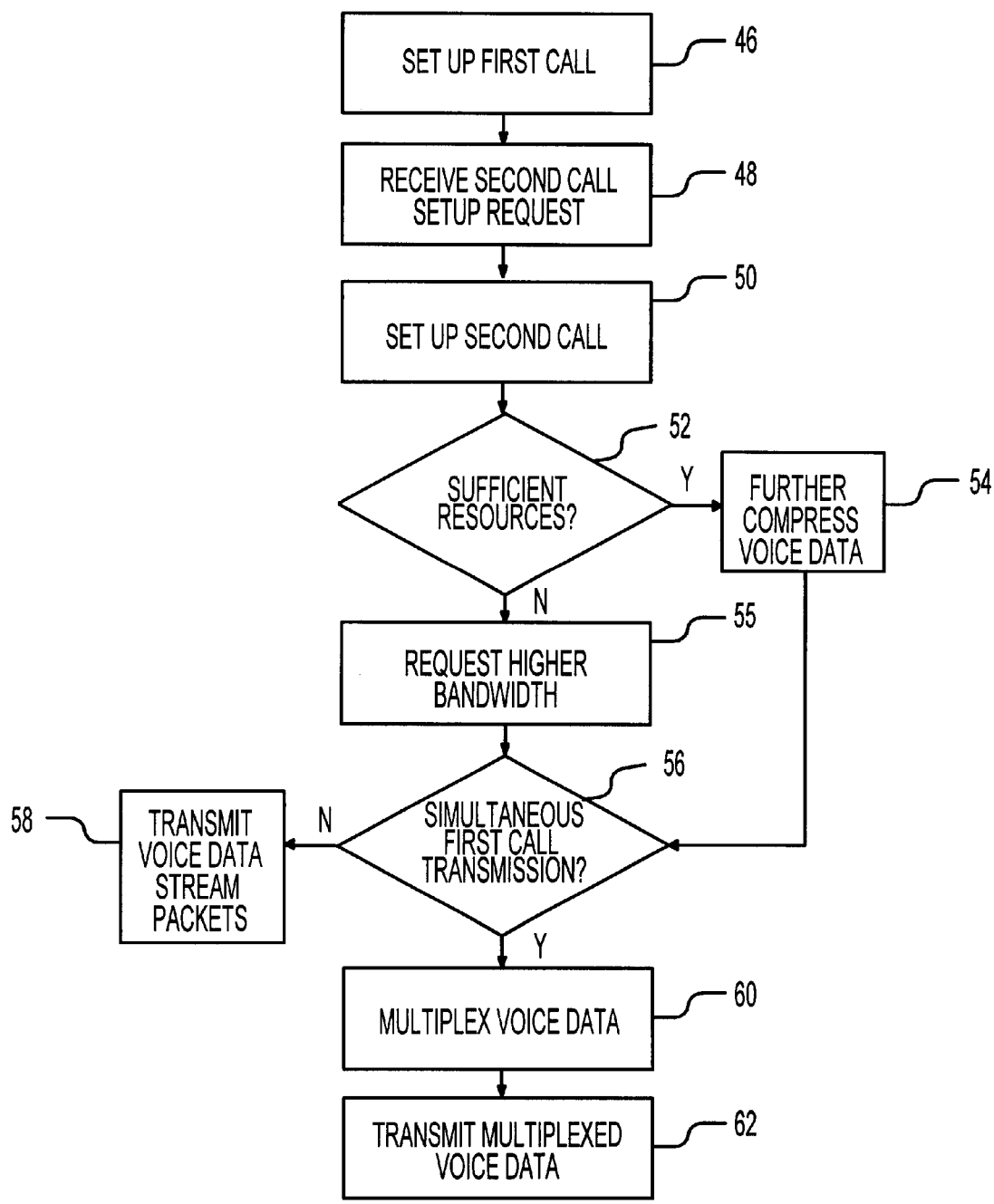
FIG. 5 is a flow diagram of a process for a preferred silent call monitoring method in a telephony-over-LAN environment.

Referring to FIG. 5, a method for enabling silent call monitoring in a TOL environment includes the step 46 of setting up a first call 15 between an ACD agent terminal 10 and a customer terminal 14. The first TOL call includes multiple voice data streams transmitted between the ACD agent 10 and customer terminals. A first voice data stream contains agent voice data transmitted from the agent terminal 10 and a second voice data stream carrying agent voice data to the customer terminal 14. Occasionally, the agent and the customer will speak in the first call simultaneously so that, for instance, first data stream packets will be transmitted in the first call simultaneously with the transmission of second data stream packets. Typically, the agent terminal will be one of multiple agent terminals in an ACD system which includes a means for routing incoming customer calls, such as a gateway. Once the gateway has facilitated establishing the first call, a supervisor terminal 12 transmits a request to the agent terminal in step 48 to establish a monitoring call which enables the supervisor terminal to monitor the first call. Upon receiving the request, the agent terminal proceeds to set up the monitoring call in step 50.

As part of the call setup, in step 52 the agent terminal determines whether it has access to sufficient processor resources to support bandwidth in the monitoring call approximately equal to the bandwidth of the first call. If sufficient processor resources are available, in step 54 the agent terminal enables a higher compression level for transmission of first and second data stream voice packets in the monitoring call than was utilized to transmit the voice packets in the first call. If the higher compression level is enabled, the compression of the voice data in the first and second data streams occurs prior to re-packetizing the voice data for transmission over the monitoring call. If sufficient processor resources are not available, in step 55 the agent terminal requests a higher bandwidth than was utilized in the first call.

The agent terminal monitors the first call for time stamps associated with first and second data stream voice packets to detect any simultaneous voice data transmissions. So long as the agent and the customer do not talk at the same time, first and second data stream voice packets can be transmitted over the monitoring call without serious concern for transmission delay or latency in the monitoring call. In step 58, if no simultaneous transmission is detected, the agent terminal simply transmits first data stream voice packets and second data stream voice packets in the order in which they were received and transmitted in the first call. Throughout the monitoring call the agent terminal continuously monitors the first call for simultaneously transmitted agent voice data and customer voice data. When the agent and the customer talk at the same time, the agent voice data and the customer voice data must be transmitted over the monitoring call for simultaneous presentation at the supervisor terminal with as little transmission delay as possible.

If a simultaneous transmission of agent voice data and customer voice data is detected in step 56, the agent terminal packetizes voice data from the first and second data streams in step 60 such that agent voice data bytes are alternated sequentially in each packet with customer voice data bytes. In step 62 the agent terminal transmits the multiplexed packets to the supervisor terminal in the monitoring call. The supervisor processes the multiplexed packets to separate the first and second data streams and then mixes the voice samples.

Figure 6:
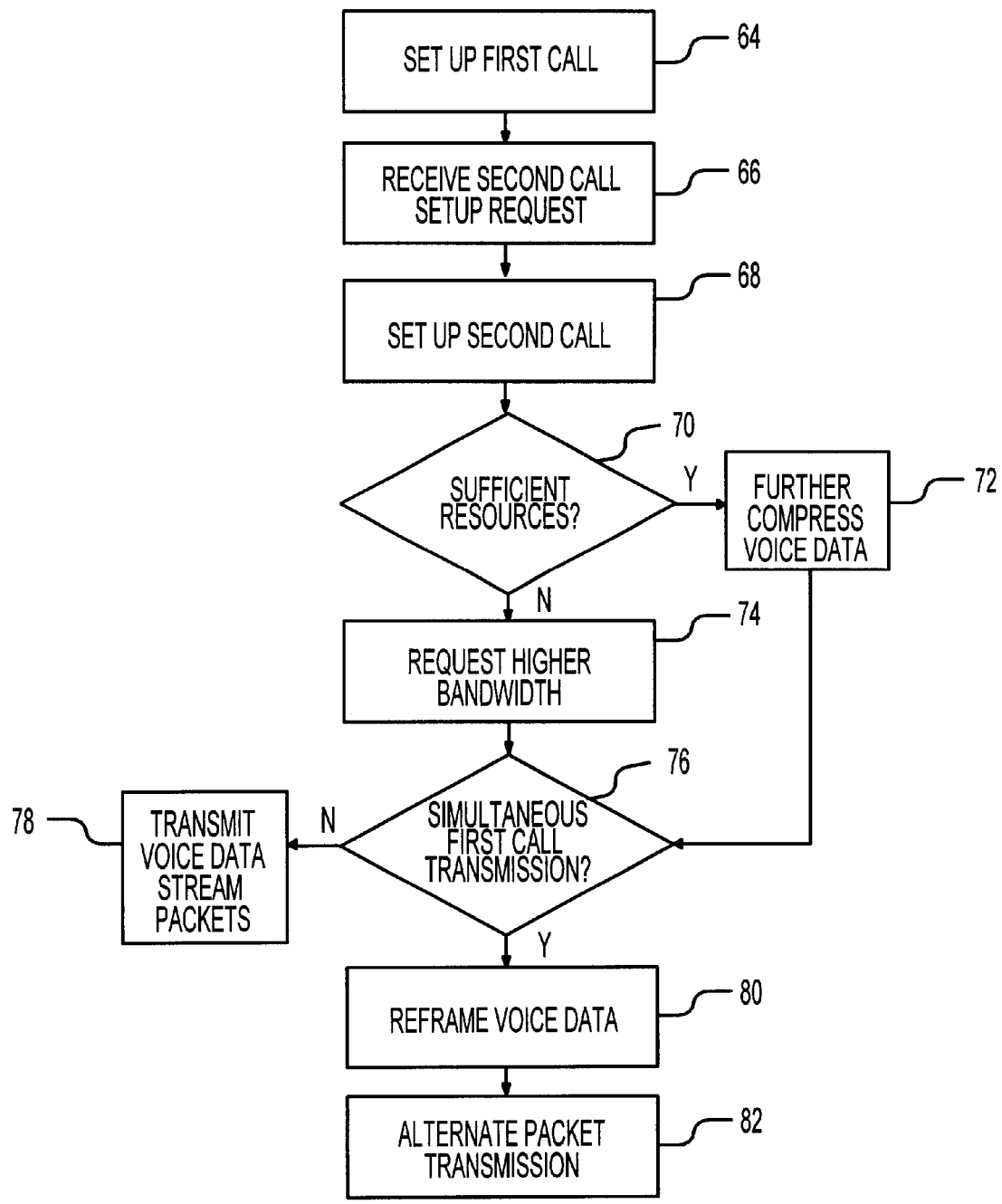
FIG. 6 is a flow diagram of a process for an alternate silent call monitoring method.

In an alternative embodiment, if the agent terminal detects a simultaneous transmission in the first call in step 56, instead of multiplexing agent voice data and customer voice data, the agent terminal reframes the voice packets of the first and second data streams and alternately transmits reframed first and second data stream packets over the monitoring call. The first and second call setup procedures are substantially the same in both embodiments. Referring to FIG. 6, the first call 15 is set up in step 64 between the agent and customer terminals 10 and 14. In response to a request to establish a monitoring call received from the supervisor terminal 12 in step 66, the monitoring call 17 is established in step 68. In step 70 the agent terminal determines whether it has sufficient processing resources to transmit the first and second voice data streams over a monitoring call having substantially the same bandwidth as the first call. If sufficient processing resources are available, in step 72 the agent terminal enables a higher compression level which is utilized in monitoring call transmissions to further compress agent voice data and customer voice data which were simultaneously transmitted over the first call. If sufficient bandwidth is not available, the agent terminal requests a higher bandwidth for the monitoring call than was utilized for the first call in step 74. In step 76, the agent terminal 10 continuously monitors the first call during the entire monitoring call to determine whether agent and customer voice data were simultaneously transmitted over the first call. When no simultaneously transmitted voice data is detected, in step 78 agent and customer voice data are transmitted over the monitoring call in the same order in which they were transmitted in the first call without significant alteration of the format of the agent and customer voice data.

If simultaneously transmitted agent and customer voice data is detected in step 76, the first and second data streams 16 and 18 are reframed in step 80 into packets so that each first data stream packet is comprised of voice data having a first call time frame which partially overlaps with the time frames of voice data in each of two second data stream voice packets. Likewise, the first call time frame of voice data in each second data stream packet overlaps with the first call time frames of voice data in each of two first data stream voice packets. In order to minimize delay most effectively, the time frame of each voice packet of one data stream overlaps with 50% of each of two time frames of voice packets of the other data stream. After the first and second data stream voice packets have been thus reframed, the first and second data stream voice packets are alternately transmitted in the monitoring call to the supervisor terminal 12 in step 82.

The present invention extends the ability to perform ACD silent monitoring to a TOL environment. Advantageously, the method and system of the present invention establish a monitoring call which does not require agent terminals to possess the processor resources to perform mixing of voice samples prior to transmission of agent voice data and customer voice data to the supervisor terminal. At most, the agent terminal either multiplexes the first and second data stream or reframes the voice data in the first and second data streams to minimize transmission delay in the monitoring call. The processor resources to perform mixing of voice samples in the first and second data streams can be more economically located in the supervisor terminals, as opposed to the agent terminal. This is more economical in ACD systems because the number of ACD agents typically substantially exceeds the number of supervisors.

What is claimed is:

1. A method for permitting a monitoring terminal to monitor a first voice-over-data-network call between first and second terminals in a telephony-over-data-network environment comprising the steps of:

setting up said first voice-over-data-network call, said first voice-over-data-network call including first voice data originating from said first terminal and second voice data generated by said second terminal and received at said first terminal;

receiving a request from said monitoring terminal to monitor said first voice-over-data-network call;

setting up a second voice-over-data-network call between said first terminal and said monitoring terminal; and transmitting said first voice data and said second voice data from said first terminal to said monitoring terminal within said second voice-over-data-network call in the absence of integrating voice samples from said first voice data with voice samples from said second voice data prior to transmitting said first and said second voice data.

2. The method of claim 1 wherein said step of transmitting said first and said second voice data to said monitoring terminal includes:

inspecting time stamps of first voice data packets including said first voice data and time stamps of second voice data packets including said second voice data to determine whether a first voice data packet was transmitted in said first call from said first terminal simultaneously with transmission of a second voice data packet; and if said simultaneous transmission was detected, multiplexing bytes from said first voice data packet with bytes from said second voice data packet to form a multiplexed packet prior to said transmitting step.

3. The method of claim 2 wherein said step of setting up said second voice-over-data-network call includes:

determining available processor resources in said first terminal; and if insufficient processor resources are available to enable said first terminal to compress said first voice data and said second voice data at a higher compression level than was utilized to transmit said first voice data and said second voice data in said first call, requesting a higher bandwidth for said second call than was utilized in said first call.

4. The method of claim 1 wherein said step of setting up said second voice-over-data-network call includes:

determining available processor resources in said first terminal; and if insufficient processor resources are available to enable said first terminal to compress said first voice data and said second voice data at a higher compression level than was utilized to transmit said first voice data and said second voice data in said first call, requesting a higher bandwidth for said second call than was utilized in said first call.

5. The method of claim 1 further comprising the steps of:

monitoring said first call for a quantity of said first voice data transmitted from said first terminal in said first call simultaneously with transmission from said second terminal of a quantity of said second voice data; and if said simultaneous transmission is identified in said first call, framing said first voice data quantity into first packets and framing said second voice data quantity into second packets such that each first packet has a transmission time that overlaps transmission times of consecutive second packets.

6. The method of claim 5 wherein said step of framing said first voice data quantity and said second voice data quantity includes framing said second portion of said second voice data quantity such that said second portion is divided substantially equally into said two consecutive second voice data packets.

7. The method of claim 1 further comprising the step of:

receiving third voice data at said first terminal from said monitoring terminal in the absence of transmitting said third voice data to said second terminal.

8. The method of claim 1 wherein said steps of setting up said first and said second calls include setting up a video teleconferencing call.

9. A system for enabling silent monitoring of a first voice-over-data-network call comprising:

a monitoring device having first means for supporting a monitoring voice-over-data-network call, said first means being responsive to a user input to generate a call setup request for said monitoring call; and a monitored device in communicative contact with said monitoring device over a data network and configured to establish said first voice-over-data-network call to a remote device such that said first call includes first voice data transmitted from said monitored device and second voice data received at said monitored device and generated by said remote device, said monitored device comprising:

a) second means for supporting said monitoring call, said second means being responsive to said call setup request to establish said monitoring call; and b) means for transmitting said first voice data and said second voice data in said monitoring call in the absence of integrating voice samples in said first voice data with voice samples in said second voice data.

10. The system of claim 9 wherein said monitored device further includes:

means for monitoring said first call for a first quantity of said first voice data which was transmitted simultaneously with a second quantity of said second voice data in said first call; and a multiplexer configured to combine first bytes from said first voice data quantity with second bytes from said second voice data quantity to form a combined packet for transmission in said monitoring call to said monitoring device.

11. The system of claim 10 wherein said second supporting means is configured to determine processor resource availability in said monitored device and to request a higher bandwidth for said monitoring call than was utilized in said first call if insufficient processor resources are available to said monitored device to compress said first voice data quantity and said second voice data quantity at a higher compression level than was utilized to compress said first voice data quantity and said second voice data quantity in said first call.

12. The system of claim 9 wherein said monitored device further includes:

means for monitoring said first call for a quantity of said first voice data transmitted from said monitored device simultaneously with transmission of a quantity of said second voice data; and a data controller responsive to detection of said first voice data quantity and said second voice data quantity to frame said first voice data quantity into first data packets and said second voice data quantity into second data packets such that each of said first data packets includes a portion of said first voice data quantity having a transmission time frame identical to a transmission time frame of a portion of said second voice data quantity, wherein said portion of said second voice data quantity is divided into two of said second data packets.

13. The system of claim 12 wherein said data controller is configured to frame said portion of said second voice data quantity into said two of said second data packets such that said portion of said second voice data quantity is approximately equally divided into said two of said second data packets.

14. The system of claim 9 wherein said monitoring device further includes means for transmitting monitoring voice data to said monitored device in said monitoring call, said monitored device being configured to receive said monitoring voice data in the absence of relaying said monitoring voice data to said remote device.

15. The system of claim 9 wherein said first supporting means and said second supporting means are configured to support internet protocol-based telephony.

16. A method for enabling silent ACD monitoring of a first voice-over-datanetwork call which includes first voice data transmitted from an ACD agent terminal to a customer terminal and second voice data transmitted from said customer terminal and received at said ACD agent terminal, the method comprising the steps of:

receiving a request at said ACD agent terminal to establish a second voice-over-data-network call to enable an ACD supervisor terminal to monitor said first voice-over-data-network call;

establishing said second call between said ACD agent terminal and said ACD supervisor terminal wherein said first voice data and said second voice data are re-transmitted from said ACD agent terminal to said ACD supervisor terminal;

at said ACD agent terminal, monitoring said first call for a first quantity of said first voice data transmitted in said first call simultaneously with transmission of a second quantity of said second voice data from said customer terminal; and re-transmitting said first voice data quantity and said second voice data quantity from said ACD agent terminal to said ACD supervisor terminal in said second call in the absence of integrating voice samples in said first voice data quantity with voice samples in said second voice data quantity.

17. The method of claim 16 further comprising the step of receiving supervisor voice data at said ACD agent terminal in said second call from said ACD supervisor terminal in the absence of transmitting said supervisor voice data to said customer terminal.

18. The method of claim 16 further comprising multiplexing bytes from said first voice data quantity with bytes from said second voice data quantity prior to said re-transmitting step.

19. The method of claim 16 further comprising framing said first voice data quantity into first data packets and framing said second voice data quantity into second data packets prior to said re-transmitting step such that each first data packet includes a first portion of said first voice data quantity which was transmitted in said first call within the same time frame that a second portion of said second voice data quantity was transmitted in said first call wherein said second portion is framed within two of said second data packets.

20. The method of claim 19 wherein said framing step includes framing said second portion of said second voice data quantity such that said second portion is divided substantially equally into said two of said second data packets.

* * * * *